United States Patent [19]

Matsuda

[11] 4,190,164
[45] Feb. 26, 1980

[54] RANDOM AUTOMATIC SELECTOR
[75] Inventor: Chiaki Matsuda, Tokyo, Japan
[73] Assignee: Mazda Cartex Company, Limited, Tokyo, Japan
[21] Appl. No.: 872,117
[22] Filed: Jan. 25, 1978
[51] Int. Cl.$^2$ .............................................. B07C 3/20
[52] U.S. Cl. .............................................. 209/610
[58] Field of Search .................... 221/5; 209/610, 608, 209/609, 611, 612, 613

[56] References Cited
U.S. PATENT DOCUMENTS
3,292,631  12/1966  Cross, Jr. .............................. 209/610

Primary Examiner—Stanley H. Tollberg
Attorney, Agent, or Firm—Oblon, Fisher, Spivak, McClelland & Maier

[57] ABSTRACT

A random automatic selector comprises a spiral rotor for sequentially lifting up and dropping the front edges of file cases so as to weaken the friction between adjacent file cases. A designated file case is dropped to a lower level because projections of the file case are not supported by any code bars since the corresponding code bars are lowered. A separation angle bar is inserted in a vertical separation recess of the designated file case and under the bottoms of the other file cases, the front edges of all of the file cases are lifted up to the normal level at a front edge supporter and the designated file case is pushed out.

5 Claims, 4 Drawing Figures

RANDOM AUTOMATIC SELECTOR

BACKGROUND OF THE INVENTION

1. Field of the Invention

The present invention relates to a random automatic selector for selecting a file case upon designating the same by information on a card or by pushing of buttons on a controller mechanism.

2. Description of the Prior Art

It has been well-known that a designated punch card is selected by inserting a sorting rod into designated holes and lifting up the sorting rod.

However, this method can not be applied for a random selection for selecting a designated file case.

The inventor has studied various types of random selectors for selecting a designated file case from file cases arranged at random.

When the file cases are held in a box, friction between adjacent file cases is relatively high in the process of separating one of them. Moreover, even though a designated file case can be dropped with the punch card system, it is difficult to take out the designated file case because the bottom of the designated file case is fitted with the code bar. The inventors have further studied various problems of the random selector for selecting a designated file case from the file cases arranged at random in a box (i.e. Japanese Patent Publication No. 36036/1974 having a random selector for cards or papers utilizing gravity; Japanese Unexamined Patent Publication No. 900/1975 relating to an electric driving device in an automatic selector for cards or papers; Japanese Unexamined Patent Publication No. 113799/1977 having a random automatic selector for cards or papers; Japanese Patent Publication No. 27400/1975 disclosing a device for projecting a slanted card or a paper utilizing gravity; and Japanese Unexamined Patent Publication No. 75300/1975 disclosing a device for preventing noise in an automatic selector for cards or papers utilizing gravity).

Although various improvements have been attained by these studies, there remains further problems with the random automatic selector in a commercial setting.

SUMMARY OF THE INVENTION

It is an object of the present invention to provide a random automatic selector for selecting a designated file case without noise and shock and taking up the designated file case without hooking on a code bar.

It is a further object of the present invention to provide a random automatic selector for selecting a designated file case by pushing out only the designated file case above code bars.

Another object of the present invention to provide a random automatic selector for operation under a designation given by information on a card or due to the pushing of buttons on a controller.

The foregoing and other objects of the present invention have been attained by providing a random automatic selector which comprises a plurality of code bars which are aligned in parallel and selectively descend corresponding to a designated code number; a plurality of file cases having projections corresponding to its own code number at the bottom and each vertical separation recess at the rear edge and each horizontal separation recess at the bottom; a spiral rotor for sequentially lifting and dropping the file cases to drop a designated file case; means for separating the designated file case at the rear edge; means for holding a front edge of the designated file case; and means for horizontally pushing out the designated file case.

DETAILED DESCRIPTION OF THE PREFERRED EMBODIMENT

Figure 1:
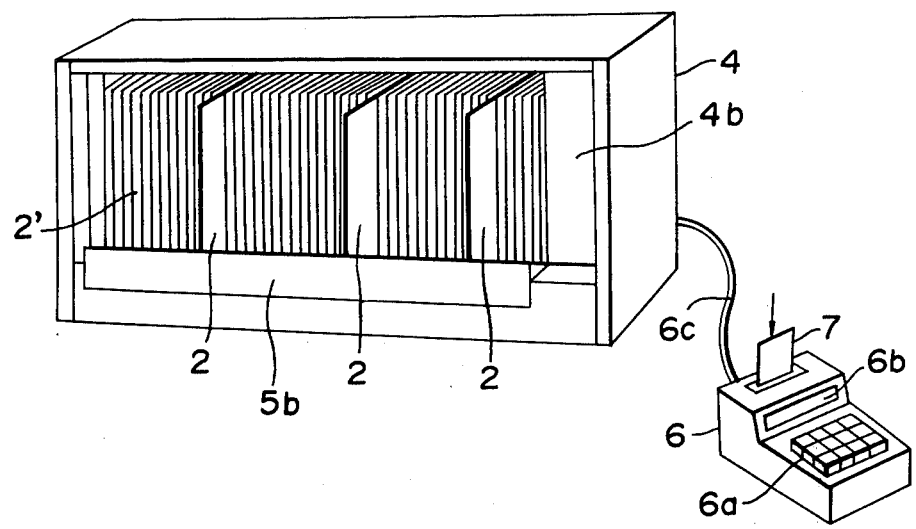
FIG. 1 is a schematic view of one embodiment of the random automatic selector according to the present invention.

Referring to the drawings wherein the same references desingate identical or corresponding parts, one embodiment of the random automatic selector of the present invention will now be described.

In FIG. 1, many file cases (2) having code pattern projections are held in a filing box (4) with a side supporter (4b). A front edge supporter (5) for covering an elongated spiral rotor (1) is disposed at the front of the filing box (4) at the bottom. A controller (6) comprises buttons (6a) for designating codes which appear on a front plate (6b). Instead of using the buttons (6a), a designation card (7) can be inserted in a card inlet thereby designating a code which appears on the front plate (6b). The information of the designated code number given by pushing the buttons or inserting the card is transmitted through a wire (6c) to code bars in the random automatic selector and the designated file case (2) is pushed out from the line of the file case on the front edge supporter (5).

Figure 2:
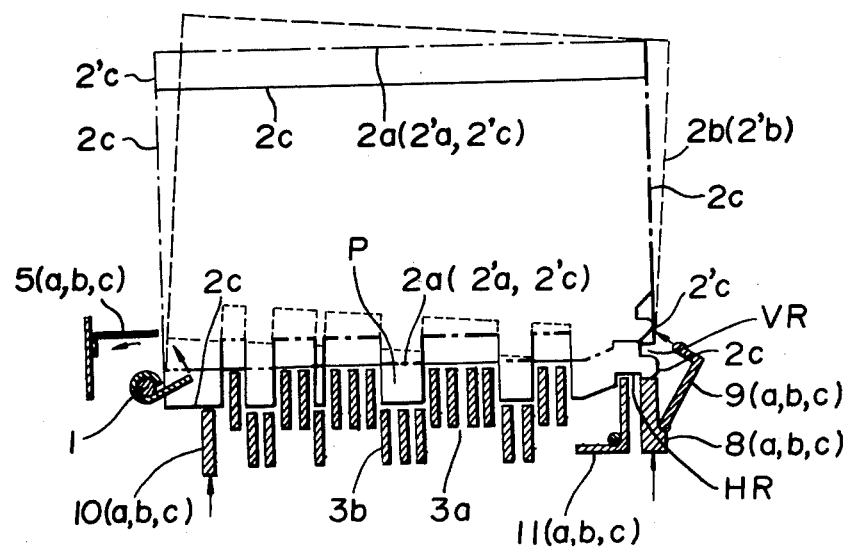
FIG. 2 is a sectional view of one embodiment of the random automatic selector in the dropped condition of the designated file case.
Figure 3:
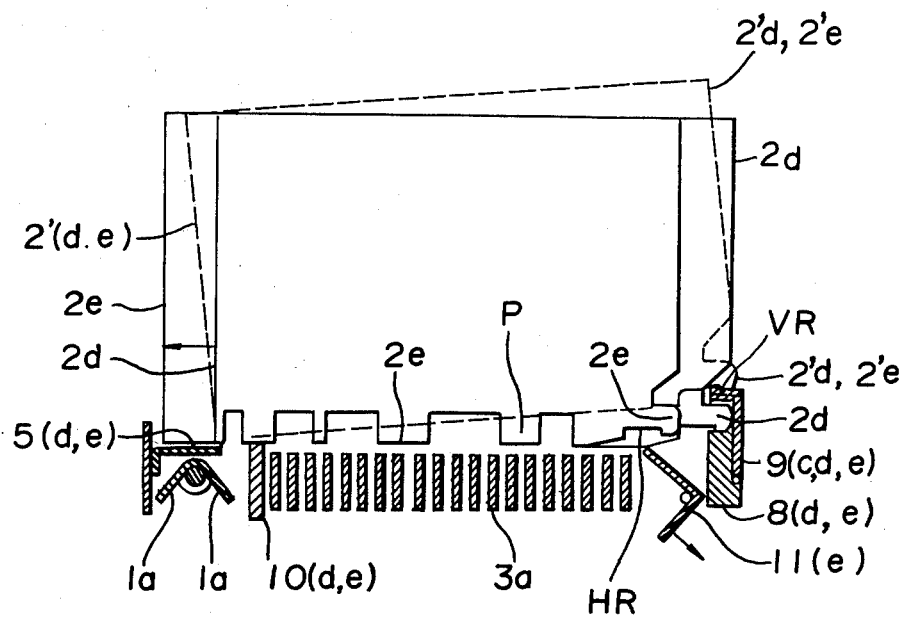
FIG. 3 is a sectional view of the embodiment of the random automatic selector in the pushed-out condition of the designated file case.

Referring to FIGS. 2 and 3 the structure and the operation of the random automatic selector of the present invention will be further illustrated.

In FIGS. 2 and 3, the spiral rotor (1) is disposed to sequentially move the front edges of the file cases (2) (2') under slow rotation. The front edge supporter (5) is disposed to cover the spiral rotor (1) and to hold the front edge of the designated file case (2). Each file case has different code pattern projections (P) at the bottom so as to move in a different manner when it is designated and also has a vertical separation recess (VR) at the rear edge and a horizontal separation recess (HR). Many code bars (3) are aligned in parallel and can be vertically shifted corresponding to the designated code number provided by the card (7) or the buttons (6b). The code bars (3) each has respectively a thickness thinner than each space between adjacent projects of the file cases (2) (2'). A separation angle bar (9) is pivoted on a lift bar (8) and the separation angle bar has a hook for holding the rear edge of the designated file case by inserting it into the vertical separation recess (VR). A push-out angle bar (11) is also pivoted on the lift bar (8). The end of the push-out angle bar (11) receives the horizontal separation recess (HR) of the designated file case (2) dropped from the line of the file cases (2) (2') upon dropping of the code bars (3) corresponding to the projections (P) of the designated file case (2) an vibrating the front edge of the file case by the spiral rotor (1). A lift bar (10) holds the front edges of the file cases (2).

Figure 4:
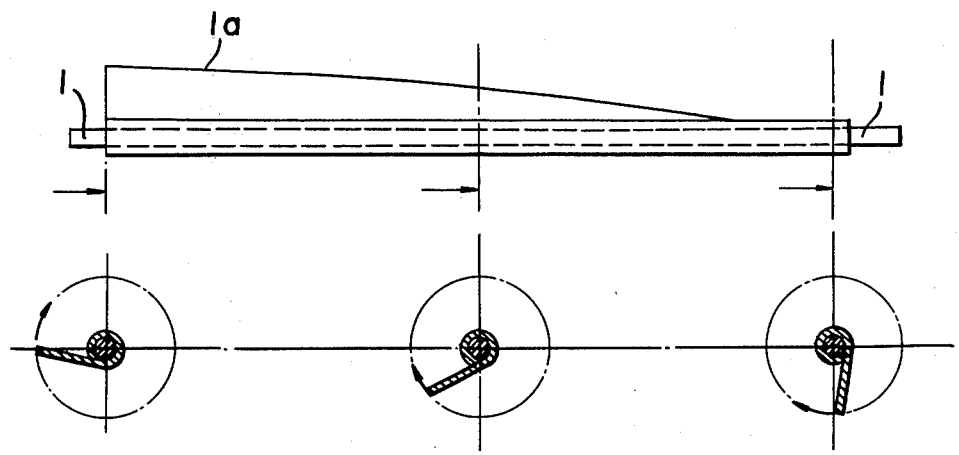
FIG. 4 is a spiral rotor used for dropping the designated file case.

FIG. 4 shows the spiral rotor (1) which has a shaft (1') and blade (1a). The shape of the blade (1a) is in a spiral form so as to sequentially lift the front edges of the file cases (2) and to drop the same with a slight shock. If the blade is not spiral but it is a plan blade, all of the file cases are lifted up and dropped with high degree of shock resulting therefrom. A large amount of energy for lifting up all of the file cases is also needed with a plan blade. On the contrary, when the spiral rotor (1) is used, only a relatively low amount of energy is needed for sequentially lifting up the file cases. Moreover, the shock caused by dropping the file cases (2)(2') is buffered by the friction between the contacted surfaces of the adjacent file cases.

When the file cases (2)(2') are sequentially lifted up and dropped, the friction between the adjacent file cases is slightly weakened and the designated file case (2) projections (P) are not held by any code bar upon lowering the corresponding code bars (3).

The designated file case (2) is dropped to the lower level as shown in FIG. 2 though all of the other file cases (2') are held, to the normal level by holding of the projections (P) of the file cases (2') by the code bars (3). In this stage, the separation angle bar (9) is turned to be inserted into the vertical separation recess (VR) whereby the designated file case (2) dropped to the lower level is separated at the rear edge. Thereafter, the lift bar (8) and the front lift bar (10) are raised to the level of the front edge supporter (5) for covering the spiral rotor as shown in FIG. 3. The designated file case (2) is still separated by the separation angle bar (9) whereby the designated file case (2) is in the normal level whereas the rear edges of the other file cases (2') are further lifted up to higher level because the separation angle bar (9) holds the bottoms of the other file cases. In this stage, the push-out angle bar (11) is turned to hook only the horizontal separation recess (HR) of the designated file case (2) because the horizontal seperation recesses of the other file cases (2') are at a higher level upon being lifted by the separation angle bar (9). Only the designated file case (2) is pushed out by the push-out angle bar (11). Since, the level of the front edge of the designated file case (2) is the same or higher than the front edge supporter (5), the designated file case (2) is smoothly pushed out. Since the position of the designated file case is horizontally shifted, the projections (P) of the file case are supported by the remaining code bars. Eventhough the lift bar (10) and the lift bar (8) are lowered to the level shown in FIG. 2, the designated file case (2) is held in the normal level under the projected condition shown in FIG. 1.

The movements of the code bars (3), the lift bar (8), the separation angle bar (9), the push-out angle bar (11), the lift bar (10), the front edge supporter (5b) and the spiral rotor (1) can be attained by mechanical members, however it is preferable to perform the movements of these parts in an electrical manner utilizing suitable timing of operation of the separate elements.

It will be evident from the foregoing that various modifications can be made to the present invention within the scope of the present invention.

The spiral rotor (1) shown in FIG. 4 will now be further described in detail.

The spiral rotor (1) includes the shaft (1') and the blade (1a) having a spiral i.e. twisted shape (twist angle of about 90 degree). It takes about 160 degrees of the rotation of the spiral rotor (1) from the initiation of the lifting up of the front edge of the file case by the blade to the position dropping the file case. Suitable twist angle should be given for dropping the file case in timing with other operations. When the length of the box for holding the file cases is too long, two or more blades (1a) are mounted on the shaft (1') whereby two or more groups of the file cases are simultaneously lifted up and dropped. When the rotary speed of the shaft (1') is too high, noise is caused due to dropping of the file cases whereby the operation time for all of file cases should be selected to be about 1 to 1.5 seconds.

The operation of the code bars (3) will now also be further described.

The code bars (3) can be moved depending upon the information given by the card (7) or the buttons (6a).

Certain code bars (3b) are lowered and the other code bars (3a) remain at their initial level through cams, magnetic means, solenoids or the other means. The code bars can be directly moved by pushing buttons.

When the designated code bars (3b) are lowered, the designated file case (2) is still held without being dropped because of the friction between the adjacent file cases (2)(2'). The designated file case (2) can be dropped to the lower level by the operation of the spiral rotor (1). Thus, in order to smoothly drop the designated file case (2) to overcome the friction, it is possible to provide any weight such as iron strip so as to increase the dead weights of the file cases. When plastic file cases containing several sheet of paper (e.g. size A-4) are used, the optimum result has been attained by inserting into each an iron strip having a thickness of 0.5 mm and a width of 20 mm and lifting up the file cases to a height of 15 mm.

The positions of the designated file case (2) and the other file cases (2') will now also be further described referring to FIGS. 2 and 3.

The file cases (2) (2') are lifted up to the levels (2b) (2'b). From the highest position, the file cases (2) (2') are dropped by the spiral rotor (1) to the levels of (2c) (2'c). The separation angle bar (9) is outwardly detached without preventing the dropping of the designated file case (2) which is supported by the front and rear lift bars (8), (10). The other file cases (2') are supported by the code bars (3a). The separation angle bar (9) is inserted in the recess (VR) to keep the different levels of (2) and (2'). When the lift bars (10), (8) are lifted up, the file cases (2), (2') are shifted to the positions (2d), (2'd). The front edge supporter (cover of spiral rotor) (5) is lowered to the level of (5d). The push-out angle bar (11) is turned by spring tension in the arrow line direction for about 45 degree whereby the recess (HR) (2c) is pushed to shift the designated file case (2) to the position (2e), out of the line (2'). The lift bars (8), (10) are dropped and the front edge supporter (5) is lifted and the push-out angle bar (11) is returned whereby the designated file case (2) is projected as shown in FIG. 1.

In accordance with the present invention, the designated file case can be separated from the other file cases without any trouble by a simple manner under easy operation and all of the problems found in the former studies by the inventor have been overcome.

What is claimed as new and desired to be secured by Letters Patent of the United States is:

1. A random automatic selector comprising a plurality of code bars which are aligned in parallel and selectively descend corresponding to a designated code number; a plurality of file cases each having projections at the bottom corresponding to its own predetermined code number and further having a vertical separation recess at the rear edge and a horizontal separation recess also at the bottom edge; an elongated spiral rotor for sequentially lifting and dropping the file cases to drop a designated file cases away from the other file cases; means for engaging the vertical recess for separating the designated file case at the rear edge; means for holding a front edge of the designated file case; and means for engaging the horizontal recess for horizontally pushing out only the designated file case.

2. A random automatic selector according to claim 1 wherein the spiral rotor is covered by said means for holding a front edge of the designated file case.

3. A random automatic selector according to claim 1 wherein said spiral rotor includes a blade having a twist angle of approximately 90 degrees.

4. A random automatic selector according to claim 1 wherein said means for separating the designated file case at the rear edge is a separation angle bar which is inserted in the vertical separation recess of the designated file case under the bottoms of the other file cases.

5. A random automatic selector according to claim 4 wherein said means for horizontally pushing out the designated file case comprises a push-out angle bar which is hooked to the horizontal separation recess of the designated file case upon lifting up the other file cases by the separation angle bar.

* * * * *